Patented Oct. 15, 1940

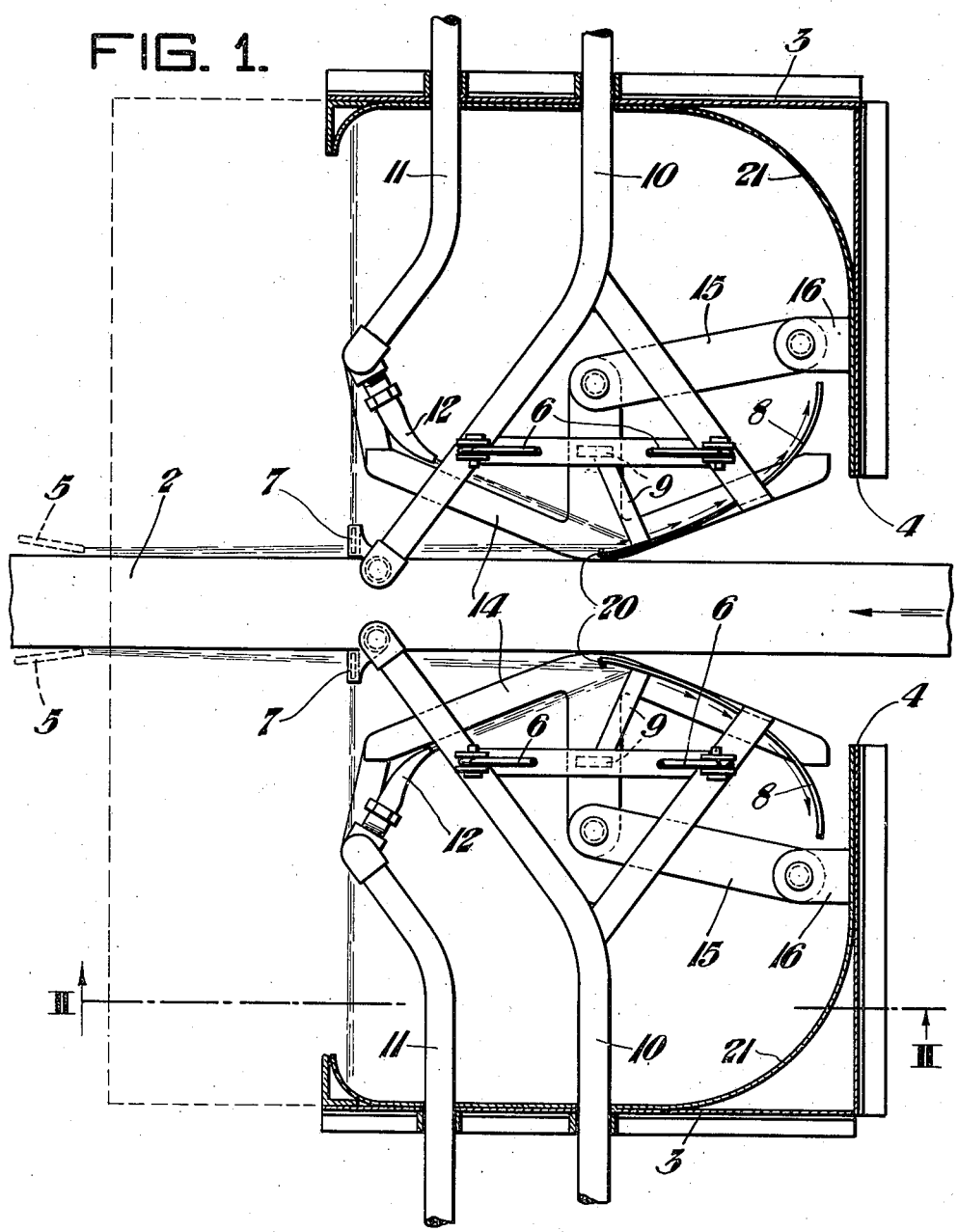

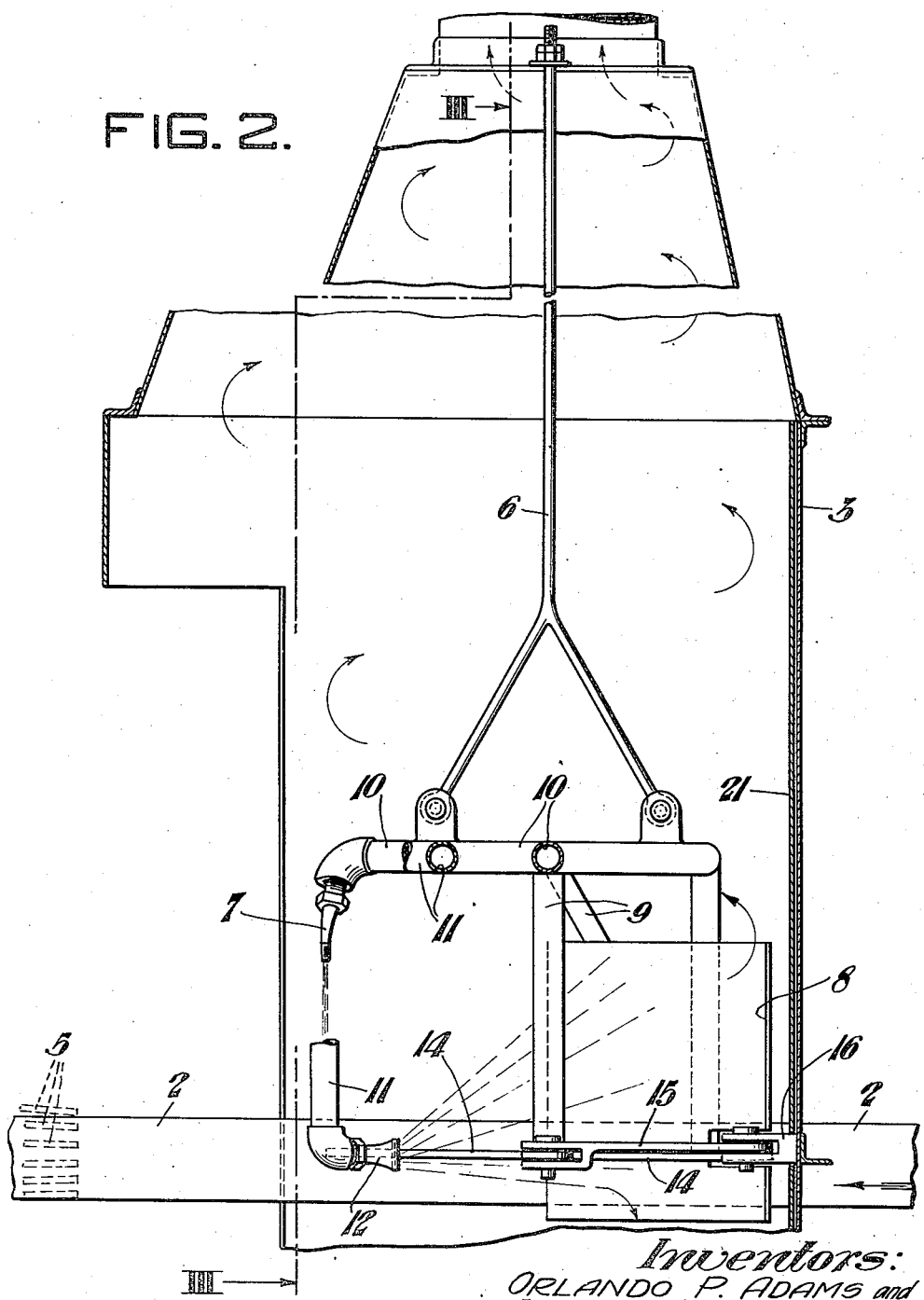

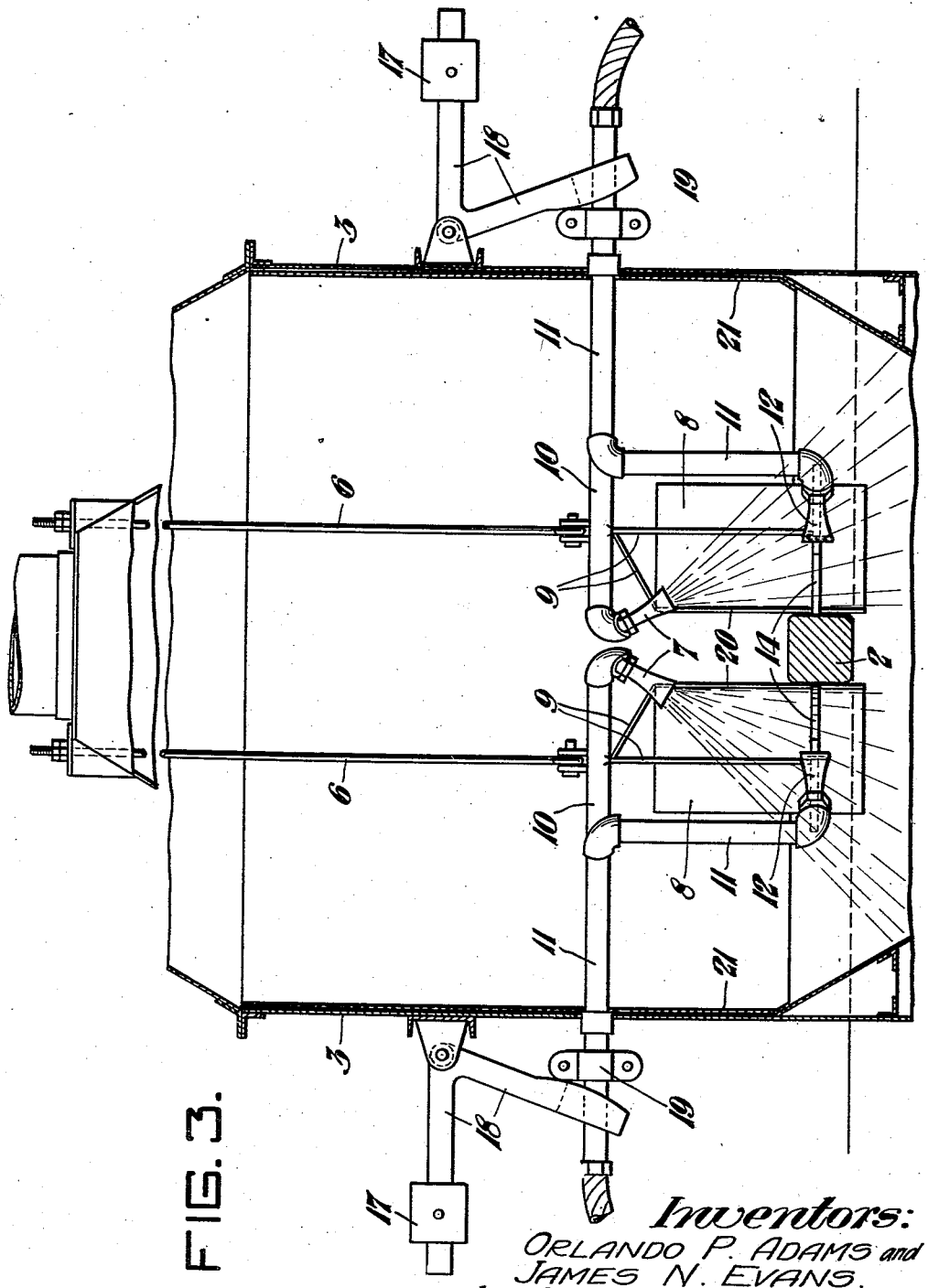

2,218,141

UNITED STATES PATENT OFFICE 2,218,141

APPARATUS FOR REMOVING FUMES AND SOLIDS IN METAL SKINNING EQUIPMENT

Orlando P. Adams and James N. Evans, McKeesport, Pa., assignors to National Tube Company, a corporation of New Jersey Application August 23, 1939, Serial No. 291,606

6 Claims. (Cl. 266—23)

The present invention relates to an apparatus for removing fumes and solids incident to an oxy-acetylene metal skinning process and equipment.

An object of the present invention is to provide for cooling the solid and gaseous products resulting from removing the surface from hot steel with oxy-acetylene torches.

Another object is to provide a hood having a curved shield for effecting cyclonic separation of the solids and gases resulting from removal of surface metal from the hot steel by torches.

Other objects and advantages will become apparent as the description proceeds and reference is had to the accompanying drawings, in which:

Figure 1 is a plan view, partly in section, of the hood arrangement embodying the present invention in position on each side of the line of travel of the body of metal;

Figure 2 is a sectional elevation on line II—II of Figure 1; and,

Figure 3 is a sectional elevation on line III—III of Figure 2.

In the drawings, the numeral 2 represents a body of hot metal, either a bloom or billet, whose surface metal is removed (skinned) by conventional type oxy-acetylene torches. Surface defects in blooms or billets have been very satisfactorily removed by passing the body of hot metal between oxy-acetylene torches and, in so doing, the particles of iron and iron oxide resulting from such skinning operation are projected by the force from the torches with tremendous velocity. Various means have been devised for collecting the removed surface metal, such means, for example, being an enlarged hood or an enlarged exhaust fan. However, these have not been altogether satisfactory.

The present invention has been devised to provide an apparatus for efficiently and successfully cooling and separating the solid and gaseous products and includes a hood 3 having a central opening 4 through which the hot body of metal 2 may pass for removal of the surface by the oxy-acetylene torches 5, which torches are only diagrammatically shown as they form no part of the invention, and may be of any conventional design. Positioned within said hood 3 and supported from the hanger 6, is an assembly including nozzles, a curved shield and a guide shoe, which assembly is designated in its entirety as a spray rig.

On each spray rig there is included a nozzle 7 so positioned and arranged as to direct a high velocity curtain or film of water downward at an angle so that one edge of the curtain or film of water just misses the side of the bloom or billet 2, whose surface is being removed when coming in contact with the line of the torches 5.

This film of water is so placed that most of the solid gaseous products of combustion must pass through it shortly after being produced in front of the torches.

A curved shield 8 is suitably supported by the hanger mechanism through bracket 9 and is positioned at the rear of said nozzle 7 adjacent the opening 4 formed in said hood 3. This curved shield 8 receives the cooled solids and gases which pass through the film or curtain of water ejected from the nozzle 7 so that the direction of the cooled solids and gases is changed from its normal path of travel so that they cannot pass out of the opening 4 in the hood 3 through which the hot body of metal enters. Connected to the main water supply pipe is another pipe 11 on which is positioned the nozzle 12, for ejecting a high velocity curtain or film of water in a plane at substantial right angles to that admitted by said nozzle 7 and at an angle to the movement of the solids and gaseous products so as to direct said solids and gaseous products against the shield 8 for changing the direction of travel of said solids and gases for effecting cyclonic separation of the same.

The iron and iron oxide drop down into a sluice pit (not shown) while the fumes are drawn upwardly through the hood by an exhaust fan (not shown). These nozzles 7 and 12, together with the curved shield 8, are rigidly attached to a guide shoe 14 which rides the side of the hot body of metal 2 passing through the hood.

The entire spray rig assembly hereinabove described, is rigidly suspended from the hanger 6 and is restrained from movement parallel to the longitudinal movement of the hot body of metal through said hood 3 by means of a bar 15 pivotally connected to said guide shoe and to an ear or other securing device 16 formed on the interior of said hood 3. A counterweight 17 is slidably mounted on a bell crank 18 which is pivotally supported on said tank 3, in any conventional manner. The counterweight 17 holds the guide shoe 14 against the side of the hot body of metal 2 and a clamp 19 restrains lateral movement of said shoe to the limit of the lateral movement of the smallest size of bloom or hot body of metal passing through said hood 3. Secured, in any conventional manner, to the forward edge of the curved shield 8 is a strip 20 whose function is to prevent water from splashing on the hot body of metal 2 as it travels through said hood.

In operation of the present invention, the hot body of metal passes through said hood into contact with the line of oxy-acetylene torches 5 which remove the surface from said metal. The removed metal and products of combustion are usually projected from the torches with a tremendous velocity and due to the directional flow of high velocity of water ejected from said nozzles 7 and 12, the products of combustion are obliged to pass therethrough and become cooled by the two water sprays. During their passage through these water sprays, the solid and gaseous products are deflected substantially at 90 degrees from their original path of travel, by engaging the curved shield 8 and, in so doing, contacting the curved rear rounded corner 21 of the hood 3.

This rounded corner deflects the products of combustion 90 degrees more and directs them back toward the original source and to the water sprays so that the iron and iron oxide solid particles drop to the sluice (not shown) while the fumes are drawn off at the top of the hood by means of an exhaust fan (not shown). This combination of wetting, cooling and producing cyclonic action of the solid and gaseous products is effective in separating the same so that the larger particles are directed downwardly to the sluice and the relatively clean gas is removed by the exhaust fan.

While we have shown and described a specific embodiment of the present invention, it will be seen that we do not wish to be limited exactly thereto, since various modifications may be made without departing from the scope of the invention, as defined by the following claims.

We claim:

1. In combination with skinning equipment of the class described for removing metal from the surface of a body of hot metal, a hood having an opening through which said body of metal passes, said hood including means for cooling the solid and gaseous products resulting from the skinning operation and means for separating the cooled solids from the gases resulting from the skinning operation.

2. In combination with skinning equipment of the class described for removing metal from the surface of a body of hot metal, a hood having an opening through which said body of metal passes, means for cooling the solid and gaseous products resulting from the skinning operation and means for deflecting the cooled, solid and gaseous products away from the hood opening.

3. In combination with skinning equipment of the class described for removing metal from the surface of a body of hot metal, a hood having an opening through which said body of metal passes, said hood including means for cooling the solid and gaseous products resulting from the skinning operation and means in contact with the body of hot metal for maintaining said cooling means spaced therefrom.

4. In combination with skinning equipment of the class described for removing metal from the surface of a body of hot metal, a hood having an opening through which said body of metal passes, said hood including means for cooling the solid and gaseous products resulting from the skinning operation and means for effecting a cyclonic separation of the cooled solids and gases resulting from the skinning operation.

5. In combination with skinning equipment of the class described for removing metal from the surface of a body of hot metal, a hood having an opening through which said body of metal passes, means for cooling the solid and gaseous products resulting from the skinning operation, means for supporting said hood around said body of hot metal and means arranged with said hood for directing a high velocity film of water downward adjacent the side of said body of hot metal.

6. In combination with skinning equipment of the class described for removing metal from the surface of a body of hot metal, a hood having an opening through which said body of metal passes, means for cooling the solid and gaseous products resulting from the skinning operation, means for supporting said hood around said body of hot metal, means arranged with said hood for directing a high velocity film of water downward adjacent the side of said body of hot metal and means for directing a high velocity film of water at substantially right angles to said first mentioned film.

ORLANDO P. ADAMS.
JAMES N. EVANS.